N. P. BOWSHER.
Power Indicator.
No. 9,768. Reissued June 21, 1881.
Fig 1
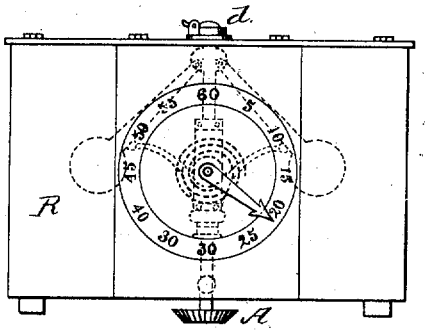
Fig. 3.
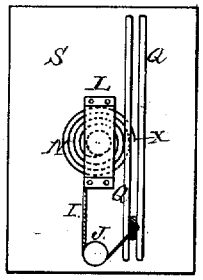
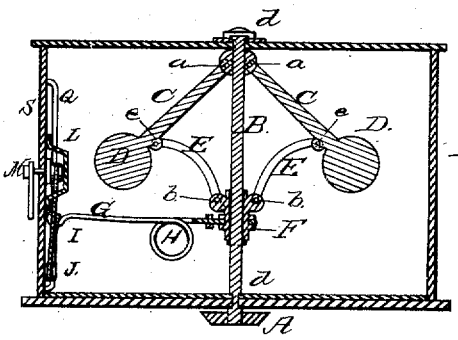
Fig, 2.
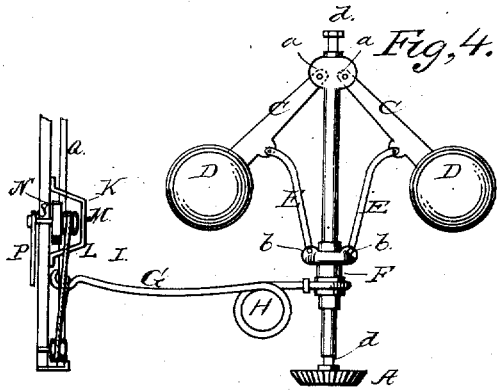
Fig, 4.
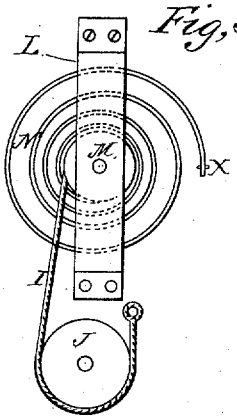
Fig, 5.
WITNESSES
Villette Anderson.
Frank J. Masi.
INVENTOR
Nelson P. Bowsher
by E. W. Anderson
his ATTORNEY

UNITED STATES PATENT OFFICE.

NELSON P. BOWSHER, OF SOUTH BEND, INDIANA.

POWER-INDICATOR.

SPECIFICATION forming part of Reissued Letters Patent No. 9,768, dated June 21, 1881.

Original No. 77,864, dated May 12, 1868. Application for reissue filed March 22, 1880.

*To all whom it may concern:*

Be it known that I, NELSON P. BOWSHER, of South Bend, in the county of St. Joseph and State of Indiana, have invented certain new and useful Improvements in Speed-Indicators; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1 is a front view of my speed-indicator. Fig. 2 is a sectional view of the same made by a vertical plane passing through the axis of the governor and the center of the dial-face. Fig. 3 is a side view, and Figs. 4 and 5 are detail views.

The nature of my invention consists in the attachment to the common form of ball-governor of a dial and pointer by which I indicate each different position of the governor, and as the different positions of the governor are caused by the varying degrees of speed of revolution, I have an index of the motion or speed, which is very useful in many cases when a given speed is to be employed, as in the case of grain-separators, where too great motion would be accompanied with too great blast, which would blow the grain out with the chaff, while too little speed would not effect a thorough cleaning of the grain.

In the accompanying drawings, the letter R indicates an outside box or casing. In this box or case is arranged the ball-governor, having a shaft, B, which runs in boxes *d d* in the top and bottom of the box R. The arms C C are connected to the shaft B by bolts *a a*, and have the heavy balls D D on their ends, connecting-links E E being attached to the arms C C by pivot-bolts *e e*, and to the sliding collar F by pivot-bolts *b b*.

G represents an arm, which is attached to the collar F, which slides up and down on the shaft B, said arm having a ring-connection or end bearing which is seated in a groove or bearing of said collar, and is thereby arranged to extend in one direction without interfering with the revolutions of the collar. This arm G is connected at its end to a cord I, which is attached to a pulley, K, and after being wound around said pulley one or more times passes around a pulley-wheel, J, arranged near the lower part of the inside of the dial-face, and thence extends up to the end of the arm G, said arm moving between guides Q Q arranged at the back of the dial-plate. In this manner a true vertical movement of the end of the indicator-arm G is insured.

The pointer P is fastened on the end of a shaft, M, which extends back through the dial-face S into a bearing, L. A coiled spring, N, is also attached to said shaft, the other end, X, of said spring being connected to the dial-plate.

The dial-face is made as shown in Fig. 1, having numbers arranged as shown, or in any other suitable manner.

It is readily seen from this description that when power is applied to the shaft B of the governor through the bevel-gear wheel A, or in any other suitable manner, and said shaft is made to rotate, the balls D D will move out from the shaft B on account of the centrifugal force, and that the amount of this motion will depend on the speed with which the shaft B rotates. As the balls D move out, the links E draw the collar F up on the shaft B. This raises the arm G, which draws the cord I working over the pulley K, and causes the spring O to tighten and the pointer P to move around the dial. As the balls D come back toward the shaft B the collar F, and consequently the arm G, move down, and the cord I is slackened, the spring N then causing the pointer to turn back on the dial. A coil, H, in the arm G serves to prevent any sudden jerks of the balls D from being transmitted to the pointer.

When this indicator is used in connection with a grain-separator it is attached to the separator in front and a little to the left of the feeder, and may be geared either to the beater or fan. In this position it is in full view of the driver or feeder, who soon sees what speed is required for the cleansing of the grain, and, noting what number is indicated by the pointer on the dial when the separator is running at the proper speed, regulates the power and feed to keep the pointer at the proper place.

Having described this invention, what I claim, and desire to secure by Letters Patent, is—

1. The combination, with a ball-governor, of a dial and pointer indicator and a connecting spring-arm, as set forth.

2. The combination, with a ball-governor, of a dial and pointer indicator, a connecting-arm, G, and guides Q Q, for keeping the arm vertical, as set forth.

In testimony that I claim the foregoing I have hereunto set my hand this 17th day of February, 1880.

NELSON P. BOWSHER.

Witnesses:

ANDREW ANDERSON,
JAMES DU SHANE.